UNITED STATES PATENT OFFICE.

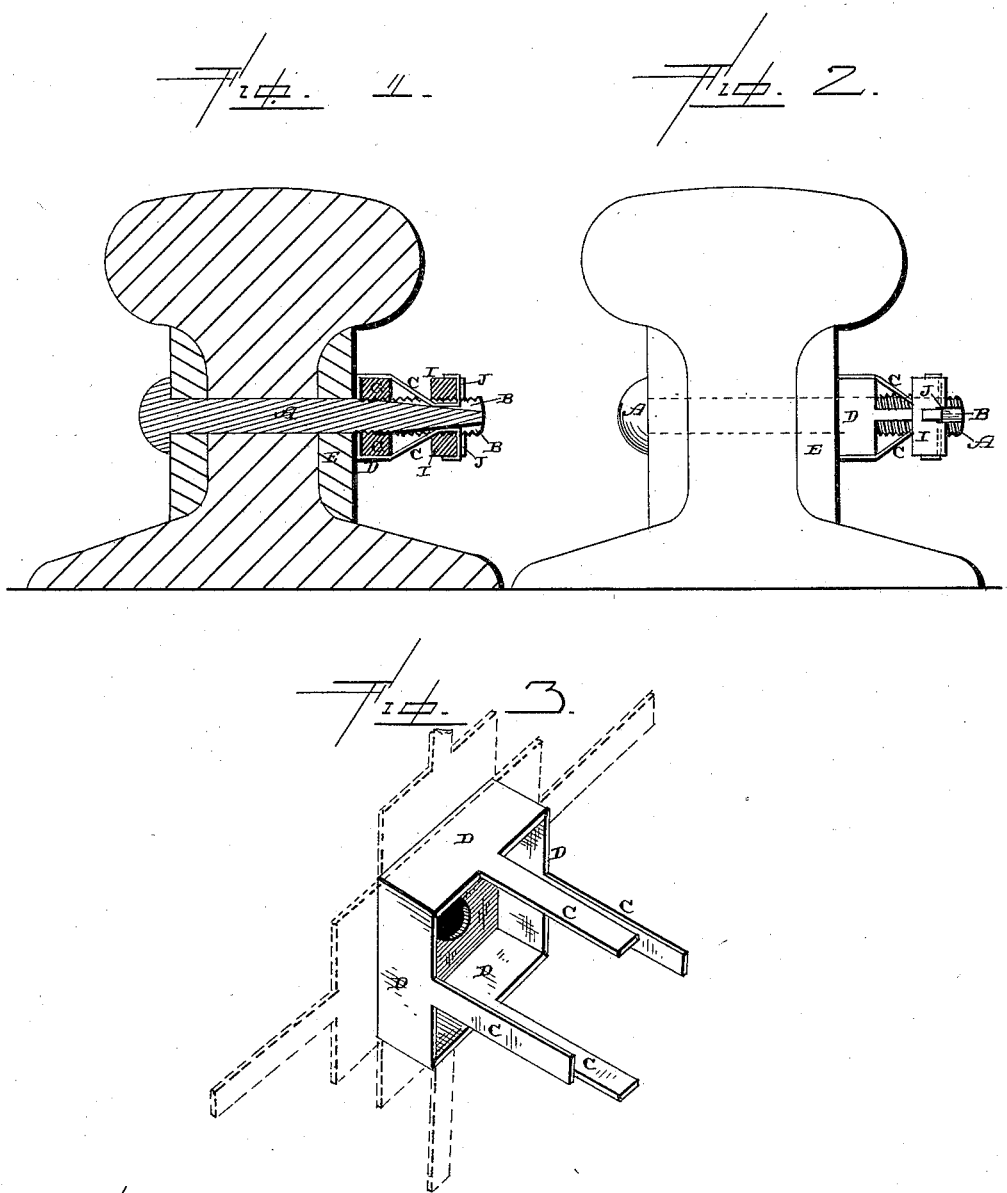

JOHN WALLACE SPAFFORD, OF AKRON, OHIO.

NUT-LOCK.

SPECIFICATION forming part of Letters Patent No. 363,259, dated May 17, 1887.

Application filed February 4, 1887. Serial No. 226,566. (No model.)

*To all whom it may concern:*

Be it known that I, JOHN WALLACE SPAFFORD, of Akron, in the county of Summit and State of Ohio, have invented certain new and useful Improvements in Nut-Locks; and I do hereby declare the following to be a full, clear, and exact description of the invention, such as will enable others skilled in the art to which it pertains to make and use it, reference being had to the accompanying drawings, which form part of this specification.

My invention relates to an improvement in nut-locks; and it consists in the combination of a screw-threaded bolt which has a number of grooves cut in its end, a washer which is passed over the bolt and placed next to the body or article that is being clamped or fastened, and which is provided with a number of arms or strips corresponding to the grooves in the end of the bolt, a nut which is placed upon the washer, and which is locked in position by having the sides of the washer turned up around it, and a second nut, which is screwed upon the grooved end of the bolt, and which is provided with recesses corresponding to the grooves for the arms of the washer to catch in, as will be more fully described hereinafter.

The object of my invention is to lock the main clamping-nut in position upon the bolt by means of a washer which is applied directly to this nut, and a second nut, which is screwed only upon the end of the bolt, but which is locked in position by arms which extend from the washer, thus making the second or outer nut fasten the inner one in place.

Figure 1 is a vertical section taken through a nut-lock which embodies my invention. Fig. 2 is an end view of the same. Fig. 3 is a perspective of the washer detached from the other parts.

A represents an ordinary screw-threaded bolt, which has a number of grooves, B, formed in its outer end. These grooves are preferably arranged in the relation to each other as shown; but there may be any desired number of them, and they may be arranged in any relation to each other that may be preferred. These grooves extend a suitable distance backward along the bolt, and are made just sufficiently deep to receive the arms or strips C of the washer D.

Passing over the bolt A, and bearing directly against the object, E, which is to be clamped or fastened, is the washer C, which is made of sheet metal, and which has its corners cut away, so that it can be turned up against the sides of the main clamping-nut G, as shown, after the bolt has been screwed tightly in position. The washer is made of any suitable sheet metal, which can be bent readily into the desired shape, and which will add but a trifle to the cost of the nut-lock. There may be any desired number of the arms or strips C extending from the outer edges of the washer; but four will be found to be amply sufficient for all practical purposes. These arms or strips, after the washer has been bent up around the main clamping-nut, are forced into the grooves or recesses made in the outer end of the bolt, and then the outer nut, I, is screwed inwardly upon the bolt to any desired extent. The outer ends of the arms or strips, being held in recesses, do not interfere with the operation of screwing the outer nut upon the bolt until the inner edge of the nut comes in contact with the arms or strips where they enter the inner ends of the grooves.

In the outer edge of the nut are formed a number of recesses, J, corresponding to the grooves formed in the bolt and to the number of arms or strips C upon the washer. After this outer nut has been screwed in position upon the bolt, the ends of the arms or strips C which extend through the outer nut are turned backward over the outer edge of the nut, so as to catch in the recess J, and thus lock this outer end in position. As this outer nut is locked in position by the arms or strips of the washer, so this outer nut locks the washer and the main nut in position. The ends of the strips or arms, being held in the grooves in the bolt, will not allow the washer to revolve until the outer nut has been removed, and as long as the outer ends of the strips or arms catch in the notches or recesses in the outer nut this nut cannot turn upon the bolt.

Having thus described my invention, I claim—

In a nut-lock, the combination of the screw-threaded bolt having its outer end grooved, the washer provided with arms or strips, the inner nut, which is placed next to the washer, and around which the washer is bent, and the outer nut, provided with notches or recesses for the ends of the arms or strips to catch in, substantially as shown and described.

In testimony whereof I affix my signature in presence of two witnesses.

JOHN WALLACE SPAFFORD.

Witnesses:
GEO. T. TAIT,
WM. B. MCMULLEN.